(No Model.)
J. P. RANDERSON & J. M. SEWARD.
CLUTCH OPERATING MECHANISM.
No. 583,581. Patented June 1, 1897.
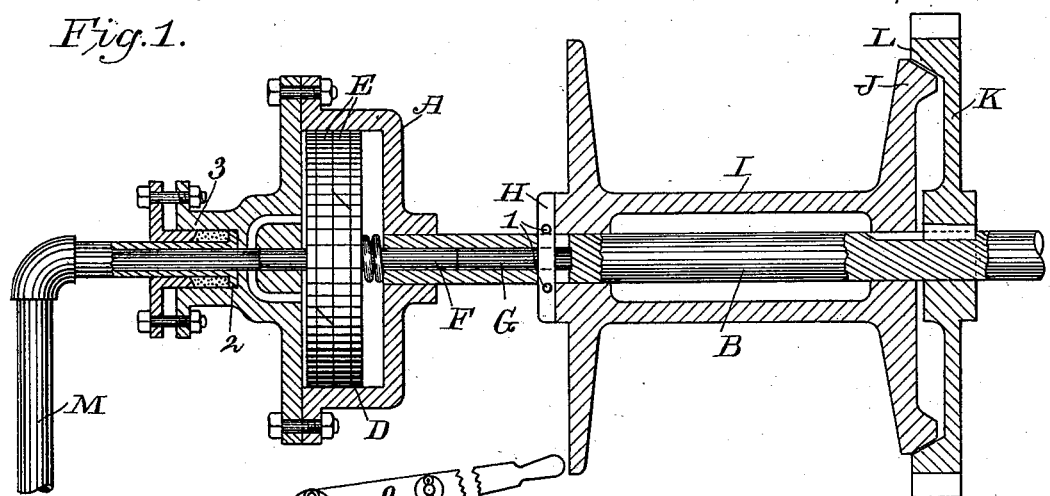
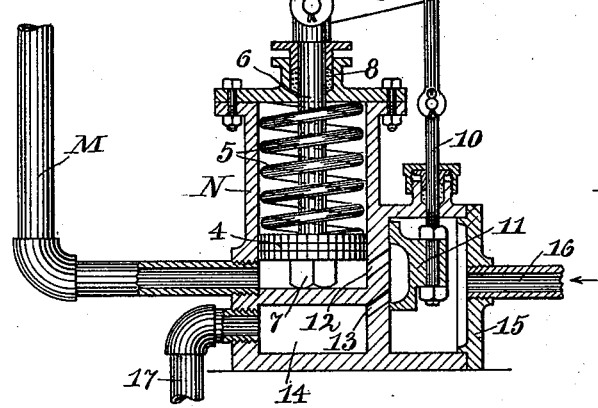
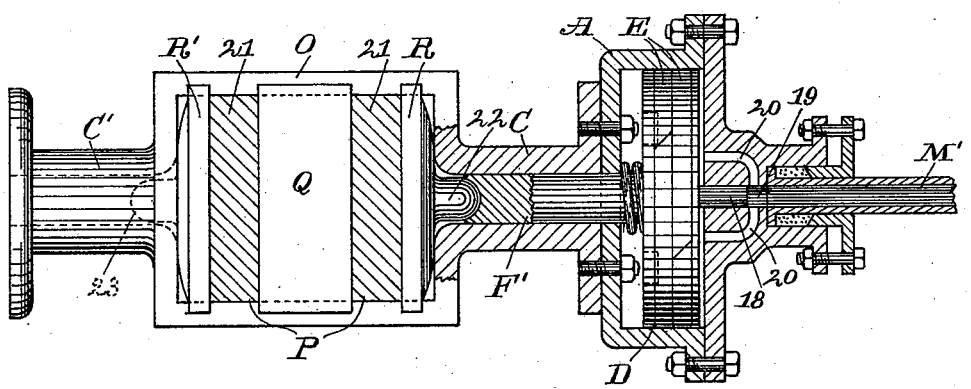
Witnesses:
J. W. Fisher
E. Luddeke
Inventors,
John P. Randerson
and John M. Seward.
by William N. Low,
Attorney.

UNITED STATES PATENT OFFICE.

JOHN P. RANDERSON AND JOHN M. SEWARD, OF ALBANY, NEW YORK.

CLUTCH-OPERATING MECHANISM.

SPECIFICATION forming part of Letters Patent No. 583,581, dated June 1, 1897.

Application filed June 24, 1896. Serial No. 596,701. (No model.)

*To all whom it may concern:*

Be it known that we, JOHN P. RANDERSON and JOHN M. SEWARD, of Albany, in the county of Albany and State of New York, have invented new and useful Improvements in Clutch-Operating Mechanisms, of which the following is a specification.

Our invention relates to improvements in mechanisms for operating clutches, but more especially to that class of clutches used on dredging machinery or other machines of a similar kind, though it is adaptable to many other purposes.

The object of our invention is to provide a simple device operated by steam or other fluid pressure that will operate clutch mechanisms in a reliable manner.

In the accompanying drawings, which are herein referred to and form part of this specification, Figure 1 is a longitudinal section of a hoisting-drum commonly used on dredging-machines and containing our improvements; Fig. 2, a vertical section of a pressure-controlling mechanism adapted to use with our invention; and Fig. 3, a front elevation, partly in vertical section, of our invention as applied to the dipper-handle of a dredging-machine.

As represented in the drawings, A designates a pressure-cylinder which, as shown in Fig. 1, is secured to a shaft B and revolves therewith whenever said shaft is in motion, but, as shown in Fig. 3, said pressure-cylinder can be secured to a trunnion C of a dipper-handle of a dredging-machine and arranged to oscillate with said handle.

D is a piston fitted to move slightly in the cylinder A and revolve with the latter. Said piston is provided with packing E to form a steam-tight joint with the bore of the cylinder A, and such packing may either be metallic, of any suitable kind, or fibrous, as may be preferred. The piston D is provided with a piston-rod F, that is fitted to slide loosely in the bore of the shaft B, as shown in Fig. 1, or in the bore of the trunnion C, as shown in Fig. 3, but in either case said piston-rod is preferably made so that it will not extend the entire depth of the bore of the shaft B or the bore of the trunnion C.

In Fig. 1 the piston-rod F is supplemented with a separate rod G, which is preferably made of the same diameter as the piston-rod F, whose inner end is fitted to take against the outer end of the rod G, and the inner end of the latter bears against a cross-key H, which has a sliding movement in a mortise in the shaft B. The key H is retained in said mortise by pins 1, inserted through said key at the opposite ends of said mortise. The movement of the piston D in one direction is transmitted through the piston-rod F and supplemental rod G to the key H, and the latter will push a hoisting-drum I endwise to effect an engagement of the clutch mechanism.

The hoisting-drum I is loosely fitted to the shaft B, so that the latter can be rotated without affecting said hoisting-drum. The latter has at the end opposite to that the key H bears against a male member J of a well-known form of friction-clutch. A spur-wheel K is secured to the shaft B, and said wheel meshes into a pinion (not shown in the drawings) which receives motion from a steam-engine or other motive power in the usual manner. The wheel K is provided with a female member L, which forms the complement of said friction-clutch. A steam-pipe M, which is provided with a collar 2 at its inner end, enters a stuffing-box 3 on the head of the cylinder A, and the packing of said stuffing-box bears against the outer face of the collar 2 to form at that point a steam-tight joint that will not interfere with the rotation of the cylinder A.

We show in Fig. 2 a pressure-controlling device which is adapted to any form of our invention. Said device consists of a steam-cylinder N, that is provided with a piston 4, which is fitted to receive a slight reciprocation in said cylinder, the motion in one direction being effected by steam or other fluid pressure and in the opposite direction by a spring 5, that is interposed between the piston 4 and the removable head of the cylinder N. A piston-rod 6 is secured in the piston 4, preferably by a screw-nut 7, which also serves as a stop motion to the inward stroke of the piston. The piston-rod 6, which passes through a stuffing-box 8 in the usual manner, is jointed to a hand-lever 9, to which is also jointed a valve-stem 10, having secured to its inner end a valve 11, which is moved by said hand-lever. The valve 11 is arranged to govern an induction-port 12, which leads into the bore of the cylinder below the piston 4, and it also governs an eduction-port 13, which leads into a chamber 14, formed in the lower end of the cylinder N, but independent of the bore of said cylinder, that is fitted to receive the piston 4. The valve 11 is contained in a steam-chest 15, which is supplied with steam from a generator (not shown in the drawings) or with other fluid-pressure, and a supply-pipe 16 conveys the pressure into said steam-chest. The steam-pipe M leads from the cylinder N, where it forms a communication with the space beneath the piston 4, and thence to the cylinder A, where the pressure will act upon the piston of said cylinder to effect the purpose it is designed for.

It should be understood that the spring 5 should be made to yield when a certain prescribed pressure on the piston 4 is exceeded. With that premise the operation of our pressure-controlling device will be as follows: The hand-lever 9 having been moved to carry the valve 11 into a position to uncover the induction-port 12, while the outer end of the hand-lever 9 is still retained in the grasp of an operative, the pressure will flow through the lower part of the cylinder N, and thence through the pipe M into the cylinder A, wherein it will force the piston D inwardly to perform its function. As soon as the pressure acting upon the piston 4 exceeds the prescribed point the piston 4 will be moved upward in the cylinder N, thereby raising the hand-lever 9, whose outer end is retained in a fixed position by the operative, to effect a movement of the valve 11 to gradually close or partially close the induction-port 12 until the prescribed pressure against the piston 4 has been attained. When the piston D has performed its required duty, the valve 11 can be moved to close the induction-port 12 and put the latter into communication with the eduction-port 13, thereby allowing the pressure to escape from the cylinder N into the chamber 14, from which it escapes through an overboard exhaust-pipe 17, either into the water in which the dredging-machine floats or into the atmosphere.

In the modification of our invention shown in Fig. 3 the cylinder A, substantially as shown in Fig. 1, is secured to a tubular trunnion C, and a piston D is fitted to move slightly in said cylinder, said piston being provided with packing E, as described in respect to Fig. 1. At one side the piston D of Fig. 3 has a guide-stem 18, which fits loosely into an opening 19, corresponding to the opening for the steam-pipe M', formed in the removable head of said cylinder and having branch openings 20 leading therefrom into said cylinder. The piston D of Fig. 3 has a piston-rod F', which extends into the bore of the trunnion C and has its inner end formed to a concave-cup shape for a purpose hereinafter explained. The trunnions C and C' are formed on opposite ends of a rectangular socket O, which carries a dipper-handle P of a dredging-machine. Said dipper-handle is usually formed of two flat pieces of timber 21, which are spaced apart, as shown in Fig. 3, and a chock Q, interposed between them to maintain them at a proper distance apart. Clamping-plates R and R' are fixed in the opening of the socket O at either side of the dipper-handle P to clasp the timbers 21 between the chock Q and said clamping-plates. The clamping-plates R and R' each have their outer face made a little convex, so that said clamping-plates, or either of them, can have a slight rocking movement when necessary against the adjacent side of the socket O. The clamping-plate R has on its convex side a spur 22, with a rounded extremity that will fit loosely in the concavity in the end of the piston-rod F', so that the clamping-plate R will be free to acquire a slight rocking movement in either direction if necessary to its proper operation when forced against the dipper-handle P. In like manner and for a like purpose the clamping-plate R' is provided with a spur 23, that enters the opening of the trunnion C'. It should be understood that, preferably, the cylinder A that is attached to the trunnion C is connected to a pressure-controlling device that is substantially like the one shown in Fig. 3, and when pressure is applied to the piston of said cylinder the dipper-handle P will be firmly held by the clamping-plates R and R', so as to prevent said dipper-handle from being moved endwise, but leaving it perfectly free to be oscillated on the trunnions C and C'.

It should be understood that the shaft B is fitted to revolve in and the trunnions C and C' to oscillate in any of the well-known forms of journal-bearings, either pillow-blocks, boxes, or other forms of journal-bearings; but the latter, the shaft B, and trunnions C and C', when separately considered, constitute no part of our invention.

We are aware that steam-cylinders and their pistons have heretofore been used for operating clutch mechanisms, but in the earlier constructions said cylinders and their pistons have been rigidly held in a non-revoluble position, while in our construction the steam-cylinder is secured to and is arranged to partake of the motion of the shaft to which said cylinder is attached. Therefore we do not broadly claim the use of a steam-cylinder and piston when adapted to operate a clutch mechanism; but

What we claim as our invention, and desire to secure by Letters Patent, is—

1. The combination of a shaft having a longitudinal opening formed concentrically therein; said shaft being arranged to revolve or to oscillate; a cylinder secured to said shaft concentrically and arranged to partake of the movement of the latter, a piston fitted to reciprocate in said cylinder and partaking of the movements of the latter, a piston-rod secured in said piston and arranged to slide loosely in the longitudinal opening of the shaft, and a clutch or gripping mechanism operated by said piston, as herein specified.

2. The combination, with a shaft having a longitudinal opening formed concentrically therein, a cylinder secured concentrically to, and arranged to partake of the movements of, said shaft, a piston fitted to reciprocate in said cylinder and to partake of the movements of said shaft, said piston having a piston-rod that is fitted to slide loosely in said longitudinal opening of the shaft, and a gripping mechanism operated by said piston, of a pressure-controlling device consisting of a cylinder, a piston fitted to reciprocate in said cylinder, an operating-lever fulcrumed to the rod of said piston, a valve operated by said operating-lever, an induction-port that is governed by said valve and arranged to admit a fluid-pressure against the lower face of said piston, and a pipe leading from the space beneath the piston of the pressure-controlling device to the cylinder of the gripping mechanism; the piston of the pressure-controlling device being adapted to yield under an exceeding pressure and to effect a closing of the induction-port of said device, as specified.

3. The pressure-controlling device herein described, the same consisting of a cylinder, N, a piston, 4, fitted to reciprocate in said cylinder, a spring, 5, fitted to bear upon said piston to effect its movement in one direction and to resist its movement in the opposite direction, an operating-lever, 9, fulcrumed to the rod of said piston, a valve, 11, provided with a valve-stem that is jointed to said operating-lever, and an induction-port, 12, that is governed by said valve, said cylinder having a chamber, 14, that is separated from the main bore of the cylinder and has an eduction-port, 13, which forms a communication—through the by-pass chamber of said valve—with the induction-port 12, and the piston being adapted to yield under an exceeding pressure and to effect the movement of the operating-lever to close said induction-port, as specified.

JOHN P. RANDERSON.
JOHN M. SEWARD.

Witnesses:
WM. H. LOW,
J. W. FISHER.